Aug. 2, 1927.
A. HERZ
1,637,610
CURRENT INTERRUPTING DEVICE
Filed March 3, 1924
4 Sheets-Sheet 1
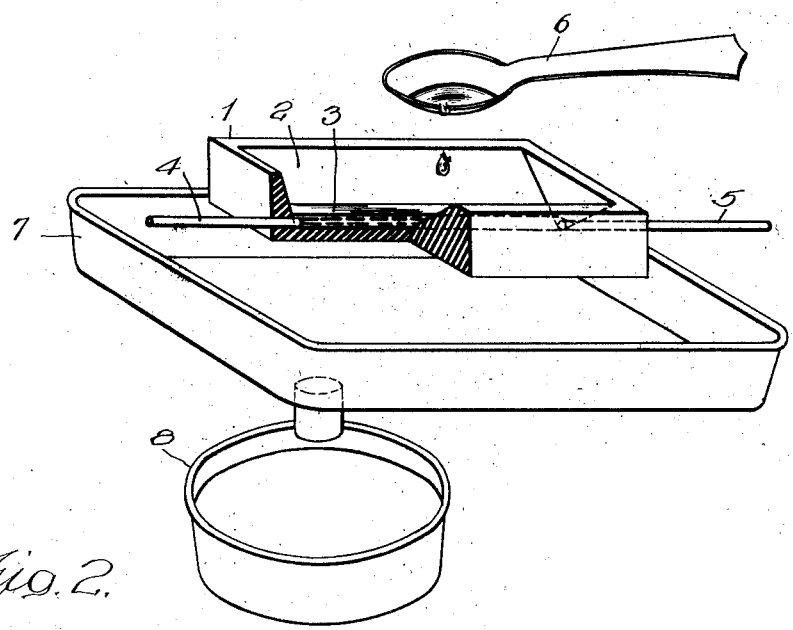
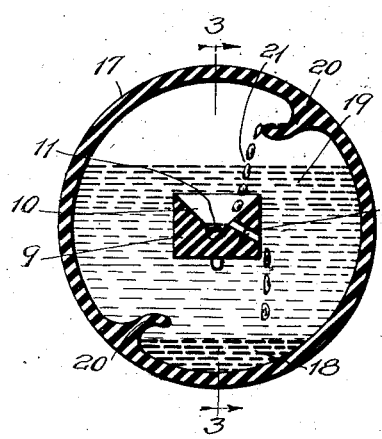
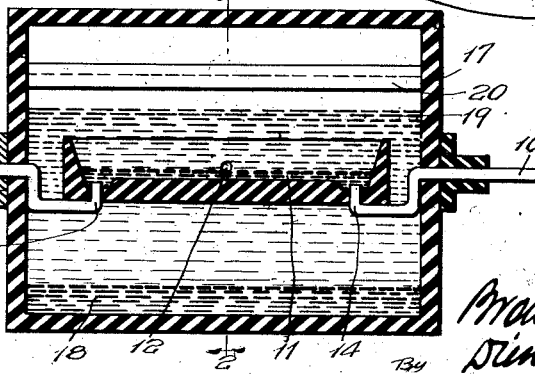
Witnesses:
W. F. Kilroy
Harry R. Leslie
Inventor
Alfred Herz
Brown Boettcher
Dinner
Attys Aug. 2, 1927.
A. HERZ
CURRENT INTERRUPTING DEVICE
Filed March 3, 1924
1,637,610
4 Sheets-Sheet 2
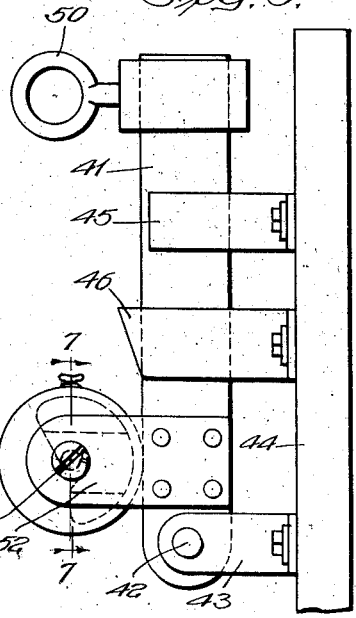
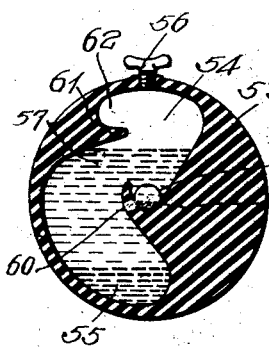
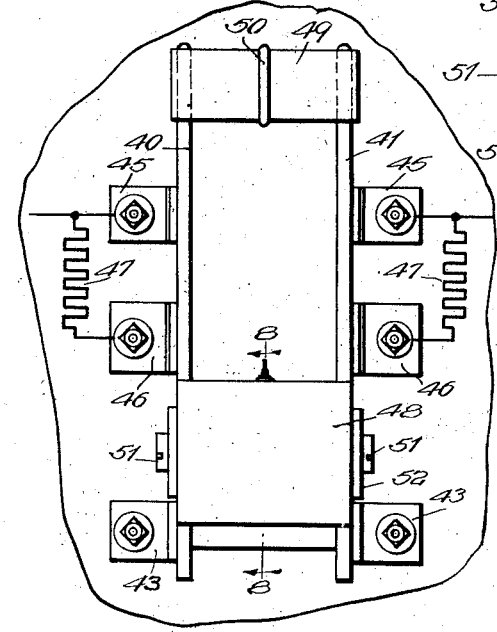
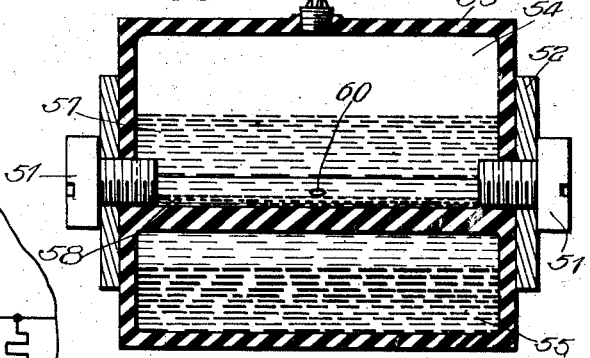
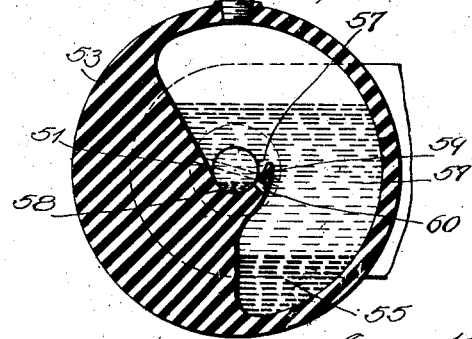
Inventor:
Alfred Herz Aug. 2, 1927.
A. HERZ
1,637,610
CURRENT INTERRUPTING DEVICE
Filed March 3, 1924   4 Sheets-Sheet 3
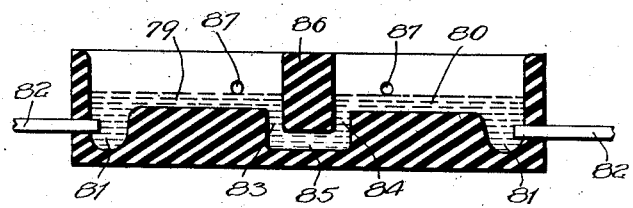
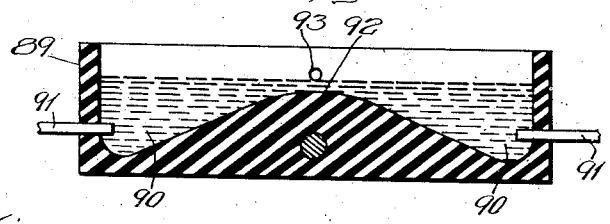
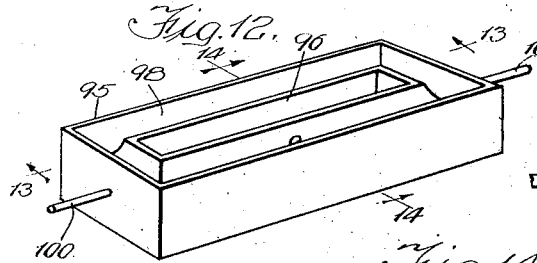
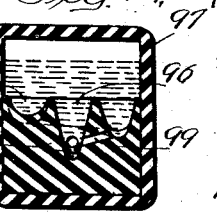
Inventor:
Alfred Herz Aug. 2, 1927.
A. HERZ
1,637,610
CURRENT INTERRUPTING DEVICE
Filed March 3, 1924 4 Sheets-Sheet 4
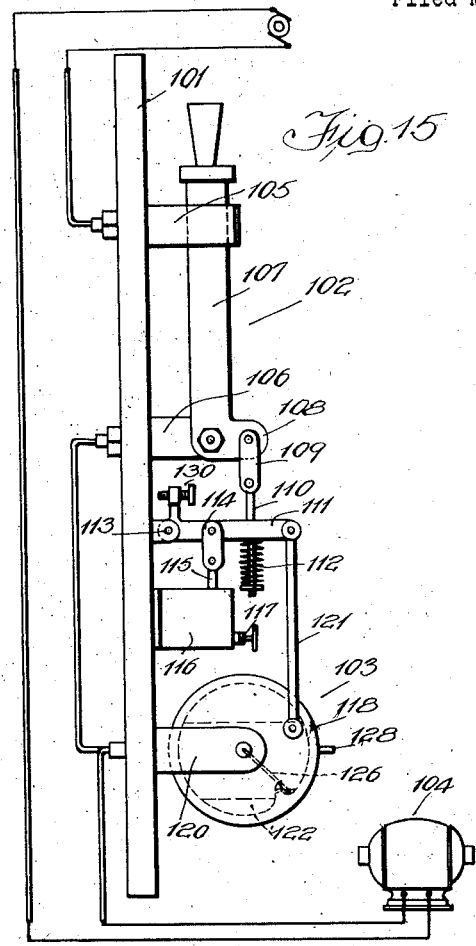
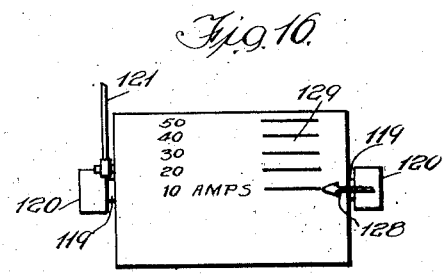
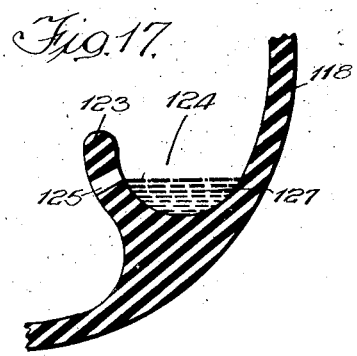
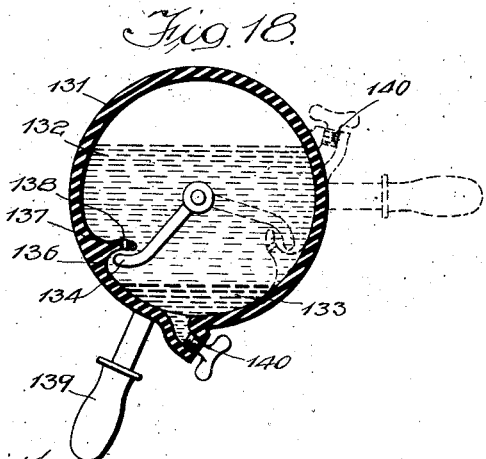
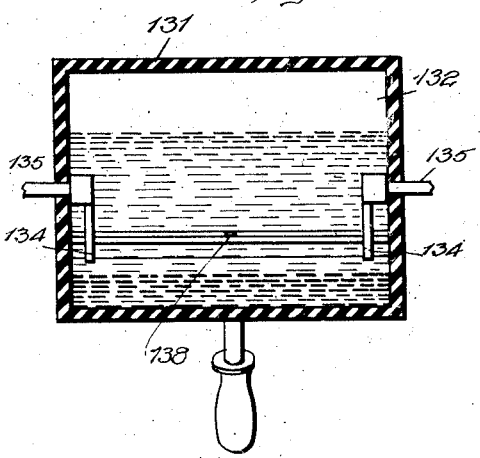
Inventor:
Alfred Herz Patented Aug. 2, 1927.

1,637,610

UNITED STATES PATENT OFFICE.

ALFRED HERZ, OF CHICAGO, ILLINOIS.

CURRENT-INTERRUPTING DEVICE.

Application filed March 3, 1924. Serial No. 696,491.

My invention relates to current interrupting devices and is particularly applicable to fuses and the like, or in mechanisms for automatically interrupting current flow when the current flow is undesirable and under certain circumstances remake the circuit.

As is, no doubt, appreciated by a number of engineers, heat is a certain criterion of current flow. It is the ultimate form which electrical energy takes in a circuit when no provision is made for its transformation otherwise. It is therefore common to rely upon the heating effect of the current to annul the current carrying function of a link or fuse.

According to my invention I propose to use a liquid instead of a solid, and preferably, but not necessarily, I employ mercury. I am aware that mercury has been used in fuses of small capacity, but believe that I am the first to employ the same in an open trough or channel in which the mercury takes its form by being restrained only on the bottom and sides. I permit the mercury to have a free surface for the purpose of permitting it to escape in the direction in which the free surface exists; namely, in a generally vertical direction.

The advantages of employing mercury for an open fuse of this kind, and by open I mean open on one side; that is the top, is primarily that it has a low specific heat and since it is already in the condition of a liquid there is no necessity for the heat to change it from the solid to the liquid condition at the usual temperatures. A further advantage lies in the relatively high resistance of mercury as compared with other conductors. It is well known that mercury has substantially sixty times the resistance of copper.

Preferably I form a trough or channel to give the mercury the desired shape, length and cross section. I may form the fuse in accordance with either one of two modes of procedure for securing a certain predetermined quantity of the liquid in the desired shape. that is, I may first measure externally a predetermined quantity of the liquid and then pour the same into the mold or trough or I may measure the liquid itself by the container or mold by letting the liquid overrun a dam or weir when the mold is filled to the desired extent.

The liquid casting which I thus form by the mold never solidifies during normal operation, and the mold is held in relatively fixed position so that the liquid may retain the desired shape. Now current is passed through the conducting liquid, and in the event of an excess of current, the liquid is disrupted and thrown out of the mold. A considerable part of the liquid is broken into fragments and thrown clear of the mold or trough, so that a barrier is interposed between the parts which prevents reformation in the fuse.

The fragments are permitted to collect by gravity upon the outside, and to reassemble by contact with each other.

The liquid may then again be poured into the mold to re-shape the same to the desired form. This may be done automatically with a time element limiting the reformation of the fuse in the mold, or it may be done manually, directly, or it may be done as a part of another operation, as, for example, opening and closing a switch or the like.

The mold itself has, in addition to its function of holding the shape of the fuse, another function in preventing the dissipation of heat upon the bottom and sides of the fuse, so as to hold it in position and in liquid condition until a relatively violent disruption occurs.

The fuse and its retaining mold may be submerged in an arc extinguishing liquid or suitably inclosed in a container under suitable gas pressure or in any other desired manner.

The fuse may take special shapes which will assist in the eruption or disruption, as, for example, by forming the same in the shape of a loop, so that the magnetic stresses tend to drive the fragments outwardly away from each other. or a part of the fuse may be flattened out while another part is rounded and the like, to secure special effect. Any number of portions of the fuse may be formed in parallel, if desired, by proper shaping of the mold.

In order to acquaint those skilled in the art with the manner of constructing and operating my invention, I shall now describe the same in connection with the accompanying drawings.

Fig. 1 is a diagrammatic view of a device embodying the invention and explaining the method of operation of my invention;

Fig. 2 is a cross sectional view taken on the line 2—2 of Fig. 3 of a device embodying my invention;

Fig. 3 is a longitudinal section taken on the line 3—3 of Fig. 2;

Fig. 4 is an isometric view of a modified form of my invention;

Fig. 5 is a side elevational view of a disconnecting switch and fuse embodying my invention;

Fig. 6 is a front elevational view of the same;

Fig. 7 is a longitudinal sectional view through the fuse taken on the line 7—7 of Fig. 5;

Fig. 8 is a cross sectional view taken on the line 8—8 of Fig. 6;

Figure 9 is another modification of the view shown in Figure 8.

Fig. 10 is a longitudinal sectional view of a different modification;

Fig. 11 is a similar sectional view of a further modification;

Fig. 12 is an isometric view of the block employed in connection with a further modified form of my invention;

Fig. 13 is a longitudinal sectional view taken on the line 13—13 of Fig. 12; and Fig. 14 is a cross sectional view taken on the line 14—14 of Fig. 12 also showing in section the enclosing casing which is omitted in Figs. 12 and 13.

Figures 15, 16 and 17 relate to another modification, Fig. 15 being a side elevational view of a device and containing a diagram of connection;

Fig. 16 is a front elevational view of the fuse device shown at the lower part of Fig. 15; and Fig. 17 is a fragmentary sectional view through the fuse device showing the mode of changing the carrying capacity of the fuse by pouring out the contents of the channel or grooves;

Fig. 18 is a cross sectional view of another embodiment of the invention; and

Fig. 19 is a longitudinal sectional view of the same.

As above pointed out, one of the fundamental ideas is an open topped matrix or mold in which the liquid conductor takes its form and from which it is automatically expelled, evaporated or otherwise removed and to which it may be restored or in which fresh liquid may be re-placed either manually or automatically by subsequent operation.

Referring now to Fig. 1 I have indicated a block of insulating material 1, which forms an open mold containing a matrix for defining a fuse of liquid conducting material, in this case mercury 3, which fills the bottom of the mold 2 and assumes by gravity the proper distribution of the material in the bottom of the groove. A pair of terminals 4 and 5 project into the end of the matrix so that they are connected by the mercury 3. These terminals may be led in otherwise than I have indicated; all that is necessary is that they should dip into the mercury sufficiently to form good contact with the mercury. The block of insulating material 1 may be, for example, porcelain, lava, or it may be of wood, bakelite, glass or any other desired material which is both insulating electrically and sufficiently heat resisting to serve the purpose. While I refer to the block of insulating material 1 as a solid or homogeneous block it is to be understood that the part which forms the groove may, if desired, be of different material from the backing thereof and in fact each part may be made of any material suitable for the duty imposed upon that specific part. A predetermined quantity of mercury 3 is poured into the matrix to form a fuse of a given capacity. For example, with the matrix illustrated in Fig. 1 a spoonful of mercury may be sufficient to give a fuse of 10 amperes current capacity and if a higher current carrying capacity is desired a greater predetermined quantity of mercury may be introduced as by means of the spoon 6 or other suitable measuring means. I do not intend to limit the invention to the measuring of the mercury or other conducting liquid outside of the matrix, as the matrix itself may become the measuring means for securing the desired amount of conducting liquid between the terminals as will be illustrated and described hereafter.

The operation of the device shown in Fig. 1 is simple and effective. After the predetermined amount of mercury 3 has been put into the matrix between the terminals 4 and 5, current may pass between the terminals through the body of mercury to the limit of the carrying capacity of the fuse.

The fuse is sensitive and in fact critical to current flow. This results primarily from the fact that the metal is already in molten condition and therefore it has an opportunity to vaporize more quickly than if the metal had to be melted from the solid to the liquid state first. Furthermore mercury is of about 60 times the resistance of copper and it has a small heat content that is specific heat and it is therefore well suited to the purpose. Assuming now that a current flow through the conductors 4 and 5 and through the mercury 3 occurs and that this current flow is higher than the value for which the fuse has been predetermined, the mercury will be rapidly heated and at least partially evaporated, but since the upper surface is adapted to radiate its heat most rapidly, it being in contact with the atmosphere or with an arc extinguishing liquid or gas whereas the bottom of the same is in contact with a non-conductor, the rapid generation of heat will form a vapor particularly on the lower side of the mercury and violently expel or eject in the form of a relatively violent eruption the mercury from the matrix with resulting interruption of the flow of current. This mercury may be collected in any suitable manner. I have shown in the illustration a pan 7 which drains into a reservoir 8 from which mercury may be measured out as by means of the spoon 6 and returned to the matrix for casting or reforming a fuse between the terminals 4 and 5.

The collecting device or pan with its reservoir and the measuring means may all be made into a single unitary device as by means of a closed cylinder as shown for example in Figs. 2 and 3. Here the mold 9 has an open groove or matrix 10 adapted to be partially filled with mercury or other suitable conducting liquid, and the quantity which remains in the matrix is determined by an overflow connection or well formed by a hole or passageway 12 in the side walls of the mold 9. In this manner only a predetermined quantity of mercury 11 can remain in the matrix and hence the size of the fuse is thereby predetermined. Terminals 13 and 14 are set in pools formed in the ends of the matrix to secure good contact, these terminals 13 forming the ends of conducting wires 15 and 16 which are stationary. The drum or container 17 is completely closed and is trunnioned or journaled on the conductors 15 and 16, a knob or other device such as indicated at 18' being provided for turning the drum for the purpose of reforming the fuse. The interior of the drum 17 is provided with a quantity of mercury 18 which forms a pool in the bottom of the container and the container is further provided with a quantity of liquid or a gas as indicated at 19 of a character suitable for extinguishing the arc. For this purpose a hydro-carbon oil such as is employed in oil switches may be used or any of the well known arc extinguishing liquids, for example, carbon-tetrachloride or chlorinated hydro-carbon or mixtures of the same may be used; or, on the other hand, air at a suitable pressure, nitrogen, argon or other inert or arc extinguishing gases may be introduced or formed which would then cover the mold 9 and the fuse which is formed therein. Since the mercury is heavier than the oil or gas and since these latter are preferably non-conductors, the two do not interfere with each other in any manner.

I have provided longitudinal vanes or scoops 20 upon the interior of the container 17 in such manner as to form troughs of sufficient capacity that they may deliver mercury from the pool 18 to the open top mold 9 so as to form the fuse 11. It can be seen that by turning the knob 181 the container or drum 17 is rotated and the vanes 20 are successively dipped into the mercury and raised therefrom to cast mercury from the troughs which are formed by the vanes into the open mold 9 as indicated by the drops 21 in Fig. 2.

Any excess of mercury which is poured into the mold 9 is returned to the pool 18 through the passageway 12 in the side of the mold, thus maintaining a predetermined amount of liquid in the mold and thereby determining the current carrying capacity of the fuse 11. Thus when excessive current flows through the fuse 11 evaporation and an eruption of the mercury out of the mold 9 occurs and the circuit is thereby opened. When it is desired to close the circuit the drum or container 17 is rotated to bring a fresh supply of mercury from the pool 18 and to pour the same into the open top mold 9 whereupon the circuit is re-closed by a fuse of the desired capacity.

The fuse does not need to be straight in form, it may be made in the shape of a loop as indicated in Fig. 4 where the block or mold 22 has an open topped groove in U-shape 24 connecting the terminals 25 and 26 which form trunnions for mounting the block 22. The block 22 is held by means of the coil spring 27 in horizontal position, the trunnions 25 and 26 being mounted in suitable bearings or pedestals 28 and 29. A stop member 30 on the block 22 engages a cooperating stop member 31 on the trunnion 28 so that the spring 27 may maintain the block 22 in horizontal position.

A hand wheel or button 32 is secured to the trunnion 25 to permit the block 22 to be turned about the axis 25—26 and to let the device dip down into a pool of mercury 34 in a suitable pan or container 35. An overflow opening 36 is formed in the side of the groove 24 so that no more than the predetermined amount of conducting liquid may remain in the groove 24. Upon the passage of excess current flow through the mercury contained in the groove 24 the mercury is erupted or ejected from the groove 24 to open the circuit.

The matter of the breaking up of the mercury upon being thrown from the open-top mold is relatively complex. There are a number of actions involved; first being the action of the evolution of vapor as being of primary importance in throwing the liquid out of the mold. It is to be remembered, however, that the fuse is in liquid condition before actual vaporization occurs and therefore it is free to move under certain inherent electrical actions, one of which is known as the "pinch" effect. This is an action apparently caused by magnetic effect upon the cross section of a conductor carrying a heavy current density. Where the conductor is a liquid the tendency is for the conductor to be thinned out and reduce its own cross section. This so called "pinch" effect is particularly noticeable in a liquid conductor of relatively large cross section and having a current flow of high current density. If desired in the present device, the liquid fuse may be sub-divided into several conductors in order to minimize the effect.

Where a special form such as that shown in Fig. 4 is employed, the current flow through the loop of liquid conductor acting through the magnetic stresses tends to expand or lengthen the loop and thus assist in the interruption of current particularly where heavy current flow is employed.

In Figures 5, 6, 7 and 8 I have illustrated an embodiment of my invention in a disconnecting switch and fuse. A pair of switch blades 40 and 41 are pivoted at their lower ends on a horizontal pivot or axis 42 in suitable clips 43 fastened upon a base member 44. Stationary line contacts 45 suitably connected to the line conductors cooperate with the switch blades 40 and 41 when the switch is closed. A pair of auxiliary contacts 46 which are connected to the main line contacts 45 through resistances 47, are adapted to make contact with the blades 40 and 41 in advance of the line contacts 45. A fuse device 48 is connected between the switch blades 40 and 41 adjacent the pivot 42. The upper end of the blades are connected together through a block of insulating material or the like 49, this block being provided with an operating eye 50 or other means for opening the switch. The fuse device 48 is connected as by means of the terminal screws 51 to conducting clips 52 which are connected respectively to the switch blades 40 and 41. The fuse 48 comprises a generally cylindrical body of insulating material 53 containing a hollow chamber 54 in the bottom of which chamber there is a pool 55 of mercury. A suitable filling plug and orifice 56 are provided through which the old and deteriorated mercury and arc extinguishing liquid or gas can be removed and replaced by fresh material. An open trough 57 is formed substantially axially of the cylinder 33 so that the ends of the screws 51 project into the same in contact with the fuse 58 which is formed by suitable quantity of mercury held in the groove 57. One side of the groove is defined by the solid insulating material and the other is defined by a wall or vane 59 which has an overflow opening 60 therein for controlling the depth of the liquid in the groove 57.

The operation of the device is as follows:
Assuming that the groove 57 contains the fuse 58 connecting the terminals 51 and if now excessive current flow through the line occurs, the fuse will be expelled from the groove 57 and the resulting arc will be extinguished by the body of arc extinguishing liquid or gas, the mercury from the fuse falling down into the pool 55 where it coalesces or combines by agglomeration into the mass of liquid. To reclose the circuit the switch is first pulled out by means of the eye 50 a suitable insulated handle or hook being employed for that purpose, and the blades 40 and 41 being swung clear of the contacts 45 and 46. As the blades 40 and 41 are swung about in the counterclockwise direction as viewed in Fig. 5 the mercury 55 from the pool in the bottom of the chamber 54 runs into the groove 57 and then when the switch is closed the excess runs over the vane 59 and some of it out the drain opening 60.

The switch blades 40 and 41 then first close the circuit through the resistances 47, then close the circuit through the contact 45 directly to line.

Upon closing the switch, it is customary to throw the switch blade in with considerable force to insure that good contact is promptly made and that any fireworks which ensue will be at some other point remote from the operator. If desired, a vane such as shown at 61 in Fig. 9 may be employed to form a scoop or gutter 62 for raising mercury from the pool 55 and discharging it by gravity into the groove 57 to connect the terminals 51.

It will be observed that the form of device illustrated in Figs. 5, 6, 7, 8 and 9 has a tendency to provide a conducting fuse of relatively high current carrying capacity at the instant that the switch is closed, and thereafter to diminish the same. This can be seen from Figs. 5 and 8, in that if the fuse 48 is moved in a counterclockwise direction and then filled, there is a tendency for the groove 57 to contain more liquid in contact with the terminals 51 when the blades 40 and 41 are out of contact than when they reach final contact position. This is due to the fact that the overflow opening 60 drains more of the liquid out as the fuse device is moved in a clockwise direction, as viewed in Figs. 5 and 8. In the form shown in Fig. 9, the final motion of throwing the switch blades in violently discharges the last part of the mercury from the channel or scoop 62 in to the groove 57 temporarily increasing the amount therein until the same can run out of the overflow opening 60.

In Fig. 10 I have illustrated a matrix having the horizontal portions 79 and 80 connected to the pools 81 for terminals 82, and these horizontal portions 79 and 80 are connected by a U-shaped portion having the vertical legs 83 and 84 joined by a generally horizontal portion 85. This U-shaped passageway is defined by the interposed block or barrier 86 which thereby lengthens the total length of the fuse. A predetermined quantity of mercury is introduced into the matrix, and upon excessive current flow the horizontal portions 79 and 80 are free to escape and to some extent also, the vertical portions 83 and 84 which are ejected with more violence than the open portions 80 because of the confined portion 85 acting upon said vertical legs 83 and 84. This illustrates the fact that different action can be secured by different forms of the fuse. All that is necessary is to form the matrix of the proper shape, and by introducing a proper quantity of the conducting liquid into the matrix the fuse is automatically formed. Where overflow openings, such as 87, are provided, it is not necessary to empty out the matrix before recharging the same with a predetermined quantity. The overflow openings 87 automatically determined the desired quantity in the matrix without reference to how much has previously remained therein or how much is introduced, so long as it is sufficient to fill the matrix.

In Fig. 11 I have illustrated a form of fuse matrix in which variations of positions of the matrix do not seriously effect the capacity of the fuse. In this case the mold 89 is made of insulating material, and it has pools 90 at the end of the matrix therein in communication with the terminals 91, and the matrix has at its center a short restricted portion for defining the actual minimum current carrying section as indicated at 92, and an overflow opening, as indicated at 93. Upon excessive current flow the portion 92 is ejected from the mold and sufficient liquid adjacent thereto as to lower the level to maintain the circuit open. If upon initial blowing of the fuse insufficient material has been ejected from the mold, the fuse will reform and, since some of the liquid has been expelled the fuse will be of less current carrying capacity than before, and thereby it will again be blown and sufficient material removed by such successive discharge or discharges as to leave the circuit open.

In Figs. 12, 13 and 14 I have illustrated a modification in which the mercury automatically flows back after it has been expelled from the fuse matrix. In this embodiment I employ a block 95 which has a central matrix 96 for containing the mercury fuse 97 in contact with suitable terminals 98 which extend into contact with the mercury in the matrix. The block 95 is enclosed in a housing or casing 97' shown in Fig. 14 and this may be filled in part with an arc extinguishing fluid. Around the outside of the matrix 96 I have formed a gutter 98' which drains back through a drain opening 99 into the matrix 96 to return all of the mercury after it is expelled from the matrix 96. The gutter 98' is given sufficient slope so that the mercury after it is expelled from the matrix 96 will run by gravity back to the drain opening 99 and thus reform the fuse. The entire charge of mercury constitutes the fuse and hence draining back reforms the same fuse. I have observed the tendency of the mercury to remain in separate globules and by adhesion to the adjacent surfaces fail to drain back by gravity. Where this occurs it is necessary to jar the mercury loose. To this end the fuse shown in Figs. 12, 13 and 14 may be permitted to remain open until the block with the terminals 100 is removed from the fuse clip terminals and shaken or jarred to reform the fuse, whereupon the fuses may be returned to the fuse clips or terminals and the circuit closed through a switch. That is to say the device may be treated like a regular cartridge fuse and reclosed merely by shaking the mercury together into a common mass or agglomeration. The viscosity of the oil or other fluid employed as arc extinguishing fluid may control the extent to which the mercury is prevented from recoalescing until it is jarred back into a common mass.

In Figs. 15, 16, and 17 I have illustrated a modification particularly useful in connection with starting electric motors.

Upon the insulating baseboard or panel 101 I have mounted a switch 102 which is adapted to be connected in circuit with a suitable fuse device 103 for closing the circuit of the motor 104 for starting the same. The switch 102 has a stationary free contact 105 and the stationary hinge contact 106 to which a suitable switch blade 107 is pivoted for movement into and out of contact with the free terminal 105. The switch blade 107 has a short arm 108 connected as by means of the link 109 and rod 110 to a swinging arm 111 through the compression spring 112. The arm 111 is pivoted at 113 upon the panel 101 and is connected through a link 114 to a piston rod 115 of a suitable dashpot 116 having the controlling valve 117. Now it will be seen that the switch 107 may freely be opened and closed but that the swinging arm 111 will be delayed in its upward movement by the dashpot 116, this delay being permitted by the spring connection 112. The rate at which the arm 111 rises may be controlled by the by-pass valve 117 of the dashpot 116. The fuse device 103 comprises a closed cylindrical member of insulating material 118 pivoted at its end on trunnions 119 in pedestals 120 which form stationary contacts connected in series with the switch terminals 105 and 106. The fuse drum or container 118 is connected by the link 121 to the swinging arm 111 so that this drum or container 118 is rotated about its pivot 119 as the arm 111 arises. The drum 118 contains a pool of mercury as indicated in dotted lines at 122 in the bottom thereof, and it has a vane or web 123 defining a trough or fuse matrix 124, the quantity of liquid therein being controlled by an overflow opening 125. Suitable terminals indicated in dotted lines at 126 in Fig. 15 extend into the ends of the fuse matrix 124 to be connected by the fuse 127 which is contained in said groove or matrix.

It will be seen that as the drum 118 is swung around in clockwise direction the matrix 124 with its contacts 126 will be submerged in the pool of mercury 122. This corresponds to open position of the switch blade 107. When the switch blade 107 is then closed the spring 112 pressing against the swinging arm 111 tends to raise the same and turn the drum 118 in a counter-clockwise direction, gradually moving the vane 123 out of the pool 122 and diminishing the mercury contents of the matrix or groove 124, thereby reducing its current carrying capacity.

An indicator 128 mounted on one of the trunnions 120 cooperates with a scale 129 on the outside of the drum or container 118 to indicate the current carrying capacity of the fuse 127 at the different positions of the drum. The swinging arm 111 has a stop in the form of an adjusting screw 130 for controlling the position at which the drum 118 stops and for thereby determining the final current carrying value of the fuse 127.

This device is particularly useful in connection with the starting of motors and the like where a heavy initial rush of current follows the closing of the circuit. Thus when the starting switch 107 is closed the current carrying capacity of the fuse 127 is a maximum because of the relatively large contents of mercury due to its angular position. As the angular position changes the contents of the matrix or groove 124 changes, thereby reducing the cross section and the current carrying capacity of the fuse 127 as the motor 104 speeds up. The two operations are preferably timed together so that as the motor speeds up and requires less current the fuse automatically reduces in cross section and thereby serving as an actual fuse. In case the motor 104 does not pick up speed properly, then the diminution of the cross section of the fuse 127 insures opening of the circuit before the motor 104 can be burned out. It will thus be seen that I have provided a device for connecting the motor to the circuit through a destructible link which changes its current carrying capacity from a maximum value to a predetermined minimum value within a predetermined period of time.

In Figs. 18 and 19 I have shown a device in which this may be accomplished by manual operation. The cylinder 131 is formed with an internal chamber 132 adapted to contain a body of arc extinguishing liquid and in the bottom thereof a pool of mercury 133. Relatively fixed terminals 134 connected to trunnions 135 project down into a groove or trough 136 which trough is formed by means of a vane or wall 137 extending longitudinally of a drum 131. A suitable overflow opening 138 is formed in the wall 137 to determine the size of the fuse at various angular positions of the drum 131. When the parts are in the position shown in full lines in Fig. 18 the groove or gutter 136 does not contain any mercury and the contacts 134 are disconnected. A handle 139 is provided for turning the drum 131 so as to submerge the contacts 134 in the body of mercury 133 to connect these contacts or terminals together by a link of large current carrying capacity. As the handle 139 is turned in counter-clockwise direction into the dotted line position as shown in Fig. 18, the amount of mercury between the terminals 134 is diminished until a predetermined minimum remains for limiting the current flow between the terminals 134. Thus when the parts are in the position shown in dotted lines in Fig. 18 the current flow is limited to so much as can be carried by the relatively small strip or stream of mercury which lies between the contacts 134. If the handle be raised further the mercury may all be poured out from between the contacts thus opening the circuit at this point.

The drum 131 is provided with a suitable filling opening and plug 140.

While I have referred to the link as a link of conducting liquid and have specifically heretofore disclosed mercury, I do not intend to limit the invention to the maintenance of the link in liquid condition at all times. While pure mercury will not solidify until a low temperature is reached I may use other material, metals, alloys, mixtures, or amalgams that may solidify at temperatures that might be different than that of pure mercury.

I have referred in the above specification, to a body of insulation, but it is to be understood that this refers only to so much of the body as is required to insulate the contacts from each other and from the mercury so that even if a metallic body be employed the surfaces thereof which engage the fuse may be sufficiently insulated to secure the desired results above set forth. The time constant of a device of this class may be controlled by the heat absorbing, storage and radiating capacity of the mold and its mounting.

I do not intend to be limited to the details shown or described.

I claim:

1. In combination, a body of insulating material having a groove therein, terminals for the ends of the groove, a body of conducting liquid in the groove connecting the terminals, and an opening in the side walls of the groove for defining the height of the liquid in the groove.

2. In combination, a switch including a terminal and a blade cooperable therewith, a fuse associated with said switch comprising a chamber having a groove therein, terminals for the groove, and a body of conducting liquid disposed in the chamber adapted to fill the groove and to be expelled by excessive current flow, and means connecting the switch blade to the fuse for causing movement of the blade to charge the groove with liquid.

3. In combination, a switch including a terminal and a blade cooperable therewith, a fuse associated with the switch comprising a body of insulation having an open groove, a terminal extending into the groove, and a body of conducting liquid in the groove, said body of liquid being adapted to be expelled from the groove by excessive current flow, and means connected to the switch blade for controlling the charge of liquid in the groove.

4. In combination, a switch, a fuse in series with the switch and means for reducing the cross section of the fuse gradually after the switch is closed.

5. In combination, a switch, a liquid fuse in series with the switch and means for reducing the cross section of the liquid fuse after the switch has been closed.

6. In combination, a switch, a fuse in series therewith, means for reducing the carrying capacity of the fuse after the switch is closed and time control means governing said aforesaid means.

7. In combination, a switch, current limiting means in series with the switch, said means comprising a liquid fuse, means for reducing the cross section of the fuse after the switch is closed, and time controlled means governing said reducing means.

8. In combination, a switch, a fuse in series therewith, said fuse comprising a stream of conducting liquid, means for reducing the amount of liquid in the stream and governing means for said reducing means.

9. In combination, a switch, a fuse in series with the switch and means controlled by the motion of the switch for reducing the carrying capacity of the fuse.

10. In combination, a pivotally mounted switch blade, a hollow chamber having a groove, a plurality of terminals in said groove electrically connected to said switch blade, and a body of conducting liquid for connecting said terminals.

11. In combination, a switch, a body of insulating material having a groove therein connected to said switch, a pocket below said groove, and a body of conducting liquid in said pocket adapted to fill such groove, the movement of said switch from closed to open position causing said liquid to pour from said pocket into said groove.

12. In combination, a switch blade, and a fuse device connected to said blade comprising a block of insulating material having a groove for holding a body of conducting liquid, said groove being adapted to hold a predetermined amount of liquid only when the switch is in closed position.

In witness whereof, I hereunto subscribe my name this 28th day of February, 1924.

ALFRED HERZ.